(12) United States Patent
Li et al.

(10) Patent No.: US 12,107,235 B2
(45) Date of Patent: Oct. 1, 2024

(54) VARIABLE-DIAMETER ADSORPTION WINDING NEEDLE MECHANISM AND WINDING MACHINE

(71) Applicant: SHENZHEN GEESUN INTELLIGENT TECHNOLOGY CO., LTD., Guangdong (CN)

(72) Inventors: Lingcong Li, Guangdong (CN); Fei Chen, Guangdong (CN); Shanghui Tao, Guangdong (CN); Ji Yang, Guangdong (CN); Rukun Yang, Guangdong (CN); Xueke Wu, Guangdong (CN)

(73) Assignee: SHENZHEN GEESUN INTELLIGENT TECHNOLOGY CO., LTD., Guangdong (CN)

( * ) Notice: Subject to any disclaimer, the term of this patent is extended or adjusted under 35 U.S.C. 154(b) by 275 days.

(21) Appl. No.: 17/740,778

(22) Filed: May 10, 2022

(65) Prior Publication Data

US 2023/0231203 A1 Jul. 20, 2023

(30) Foreign Application Priority Data

Jan. 14, 2022 (CN) .......................... 202210041126.8

(51) Int. Cl.
*B65H 75/24* (2006.01)
*B65H 54/70* (2006.01)
*H01M 10/0587* (2010.01)
*H01M 10/052* (2010.01)

(52) U.S. Cl.
CPC ...... *H01M 10/0587* (2013.01); *B65H 54/707* (2013.01); *H01M 10/052* (2013.01)

(58) Field of Classification Search
CPC .............. B65H 54/707; B65H 2406/33; B65H 19/2276; B65H 75/248; H01M 10/0587
See application file for complete search history.

(56) References Cited

U.S. PATENT DOCUMENTS

| | | | | |
|---|---|---|---|---|
| 2,705,111 | A * | 3/1955 | Bruestle | B65H 75/2484 242/576.1 |
| 5,775,631 | A * | 7/1998 | Murakami | B65H 18/04 242/573.9 |
| 7,775,475 | B2 * | 8/2010 | Tanaka | B29D 30/242 242/532.2 |
| 8,708,271 | B2 * | 4/2014 | Noll | B41F 17/002 242/573.7 |
| 2006/0214047 | A1 * | 9/2006 | Michel | B65H 75/24 242/571.4 |

(Continued)

*Primary Examiner* — Sang K Kim
(74) *Attorney, Agent, or Firm* — IP & T GROUP LLP

(57) ABSTRACT

A variable-diameter adsorption winding needle mechanism and a winding machine are provided. The variable-diameter adsorption winding needle mechanism includes a winding needle assembly, a first adsorption winding needle, a second adsorption winding needle and a pin assembly. A plurality of adsorption holes are provided on the outer peripheral surfaces of the first adsorption winding needle and the second adsorption winding needle. At the same time, the winding needle assembly is also used to drive, under the driving of the pin assembly, the first adsorption winding needle and the second adsorption winding needle to move close to or away from each other.

20 Claims, 2 Drawing Sheets

(56) References Cited

U.S. PATENT DOCUMENTS

2009/0289143 A1* 11/2009 Tanaka ............... B65H 19/2276
 242/581
2023/0231203 A1* 7/2023 Li ..................... H01M 10/0587
 242/615.4

* cited by examiner

VARIABLE-DIAMETER ADSORPTION WINDING NEEDLE MECHANISM AND WINDING MACHINE

CROSS-REFERENCE TO RELATED APPLICATION

The present disclosure claims priority to Chinese patent application with the filing number 202210041126.8 filed on Jan. 14, 2022 with the Chinese Patent Office, and entitled "Variable-diameter Adsorption Winding Needle Mechanism and Winding Machine", the contents of which are incorporated herein by reference in entirety.

TECHNICAL FIELD

The present application relates to the technical field of lithium cell manufacturing, and in particular to a variable-diameter adsorption winding needle mechanism and a winding machine.

BACKGROUND ART

During development of lithium cell equipment, the ultimate efficiency is regarded as the ultimate goal which is constantly pursued in the industry, and also an important motivation for promoting development of the lithium cell industry. At present, the separator needs to be cut off after stopping when the winding of the winding needle is switched, and at the same time, the dislocation of the tabs (i.e. electrode tabs for jellyrolls) is an urgent problem to be solved in the lithium cell industry. In the prior art, the dislocation of the tabs is corrected by the methods, such as sticking Teflon and so on, which are time-consuming and require a lot of manual work, wherein Teflon itself has the problems of fluffing and falling, etc., thus seriously affecting the equipment efficiency and the utilization rate.

SUMMARY

The objects of the present application comprise, for example, providing a variable-diameter adsorption winding needle mechanism and a winding machine, which can realize that the separator is cut off without stopping the separator, and at the same time, realize the continuous winding on the new winding needle with the speed not reduced, after the separator is cut off.

Simultaneously, it realizes the automatic change of the diameter according to the situation of the dislocation of the tabs, and realizes that the dislocation of the tabs is adjusted by the unmanned operation, with the separation of the winding needles, which improves the equipment efficiency and the utilization rate.

Embodiments of the present application can be implemented as follows.

On the first aspect, the present application provides a variable-diameter adsorption winding needle mechanism, comprising a winding needle assembly, a first adsorption winding needle, a second adsorption winding needle and a pin assembly, wherein the winding needle assembly is configured to be connected with a winding head, and rotated under driving of the winding head, the first adsorption winding needle and the second adsorption winding needle are arranged oppositely and spliced to form a winding needle head for winding a material tape, an accommodating through hole running through the winding needle head at center thereof is provided at a splicing position between the first adsorption winding needle and the second adsorption winding needle, the winding needle assembly is arranged as partially penetrating through the accommodating through hole and extends out from one end of the winding needle head, the pin assembly is arranged at the other end of the winding needle head and is arranged opposite to the accommodating through hole, and is configured to be in detachable transmission connection with the winding needle assembly, a plurality of adsorption holes for adsorbing the head of the material tape are provided on an outer peripheral surface of each of the first adsorption winding needle and the second adsorption winding needle, the winding needle assembly is further configured to drive the first adsorption winding needle and the second adsorption winding needle to move away from or close to each other under driving of the pin assembly, so as to increase or decrease a winding diameter of the winding needle head.

In an optional embodiment, a negative pressure cavity is provided on each of the first adsorption winding needle and the second adsorption winding needle, and each of the adsorption holes is communicated with a corresponding negative pressure cavity, and the negative pressure cavity is externally connected with a negative pressure pipeline which is configured to be connected with a negative pressure pump.

In an optional embodiment, the winding needle assembly comprises a fixing seat, a transmission shaft, a movable rod, a first movable block and a second movable block, the fixing seat is configured to be connected with the winding head, the transmission shaft has one end connected with the fixing seat and the other end arranged penetratingly in the accommodating through hole, and a movable through hole is formed at an axis of the transmission shaft and the movable rod is movably arranged in the movable through hole, the pin assembly is configured for being engaged with the transmission shaft and abutting on the movable rod, the first movable block and the second movable block are each arranged in the accommodating through hole, the first movable block is connected with the first adsorption winding needle, the second movable block is connected with the second adsorption winding needle, and the movable rod is in transmission connection with the first movable block and the second movable block simultaneously and is configured to move along the movable through hole under abutment of the pin assembly and drive the first movable block and the second movable block to move in opposite directions to make the first adsorption winding needle and the second adsorption winding needle move close to or away from each other.

In an optional embodiment, the movable rod is provided thereon with a first movable bearing and a second movable bearing at interval, and the first movable block is provided with a first oblique hole which is inclined upwardly, the first movable bearing is movably accommodated in the first oblique hole and is configured to move in the first oblique hole under driving of the movable rod to drive the first movable block to move in a direction perpendicular to the movable rod, the second movable block is arranged as spaced apart from the first movable block and is provided with a second oblique hole inclined downwardly, and the second movable bearing is movably accommodated in the second oblique hole and is configured to move in the second oblique hole under driving of the movable rod, so as to drive the second movable block to move in a direction perpendicular to the movable rod.

In an optional embodiment, the first movable block and the second movable block are provided as plural, and the first movable bearing and the second movable bearing are provided as plural, the plural first movable blocks are connected to two sides of a bottom of the first adsorption winding needle, and the plural second movable blocks are connected to two sides of a top of the second adsorption winding needle, each of the first movable blocks is provided with the first oblique hole, a plurality of the first movable bearings are assembled in the plurality of the first oblique holes correspondingly one-to-one, and the plural second movable bearings are assembled in the plurality of second oblique holes correspondingly one-to-one.

In an optional embodiment, a first elastic member is further provided at one end of the movable through hole close to the fixing seat, and the first elastic member abuts against an end of the movable rod and is configured to provide, to the movable rod, an elastic force towards the pin assembly.

In an optional embodiment, the pin assembly comprises a bearing seat, a connecting rod, an abutting rod and a brake caliper, wherein the connecting rod is provided as movably penetrating through the bearing seat, the abutting rod has one end connected with one end of the connecting rod and the other end configured to abut on the movable rod and drive the movable rod to move, and one end of the connecting rod away from the abutting rod is configured to move under driving of a linear driving member and is configured to drive the abutting rod to move close to or away from the movable rod, and the brake caliper is arranged on the bearing seat so as to selectively fix the connection rod.

In an optional embodiment, the pin assembly further comprises a positioning sleeve, the positioning sleeve is disposed at an end of the abutting rod away from the bearing seat and is configured for being connected, in an inserting way, with an end of the transmission shaft, so that the movable rod and the abutting rod are placed as aligned.

In an optional embodiment, an end of the abutting rod close to the bearing seat is provided with an adapter, and the abutting rod is connected with the connecting rod through the adapter, a second elastic member is arranged between the adapter and the positioning sleeve, and the second elastic member is configured to provide to the positioning sleeve an elastic force away from the bearing seat.

In an optional embodiment, an end of the connecting rod away from the abutting rod extends out of the bearing seat and is provided with a connecting head, the connecting head is configured in such a way that the connecting head and the linear driving member abut against each other, the brake caliper is arranged on a side of the bearing seat close to the connecting head, a third elastic member is arranged between the connecting head and the brake caliper, and the third elastic member is configured for providing to the connecting head an elastic force away from the bearing seat.

On the second aspect, the present application provides a winding machine, comprising a winding head and the variable-diameter adsorption winding needle mechanism according to any one of the embodiments mentioned above, wherein the winding needle assembly is connected to the winding head.

The beneficial effects of the embodiments of the present application comprise, for example, the following.

In the variable-diameter adsorption winding needle mechanism provided by the embodiments of the present application, the winding needle assembly is connected with the winding head, the first adsorption winding needle and the second adsorption winding needle are oppositely arranged and spliced to form the winding needle head, and the winding needle head is used for winding the material tape, an accommodating through hole that runs through the winding needle head at the center thereof is provided at the splicing position between the first adsorption winding needle and the second adsorption winding needle, and the winding needle assembly partially penetrates through the accommodating through hole and extends out from one end of the winding needle head, the pin assembly is arranged at the other end of the winding needle head and is arranged opposite to the accommodating through hole, and is used to be in detachable transmission connection with the winding needle assembly, the plural adsorption holes, which are used to absorb the head of the material tape, are provided on the outer peripheral surface of each of the first adsorption winding needle and the second adsorption winding needle, and at the same time, the winding needle assembly is also used to drive the first adsorption winding needle and the second adsorption winding needle to move close to or away from each other under the driving of the pin assembly (i.e., multiple pins (points) are connected with and synchronized with a movable mechanism), so as to reduce or increase the winding diameter of the winding needle head. Compared with the prior art, the variable-diameter adsorption winding needle mechanism provided by the present application absorbs the head of the material tape through a plurality of adsorption holes, thereby avoiding that the material tape passes through the winding needle to achieve the clamping, and it can be realized that the winding needle is replaced for performing the winding without stopping the material tape, which further improves the production efficiency of the winding machine; and at the same time, the winding diameter of the winding needle head can also be automatically adjusted, so that the automatic changing of the diameter is realized for the winding head, in the situation the dislocation of the tabs is digitally automatically adjusted, wherein the dislocation of the tabs is adjusted in the unmanned operation, which improves the equipment efficiency and the utilization rate.

BRIEF DESCRIPTION OF DRAWINGS

In order to illustrate the technical solutions of the embodiments of the present application more clearly, the drawings to be used in the embodiments will be briefly introduced as follows. It should be understood that the following drawings only show some embodiments of the present application, and therefore should not be regarded as a limitation to the scope. For those skilled in the art, other related drawings can also be obtained according to these drawings without any creative efforts.

Figure 1:
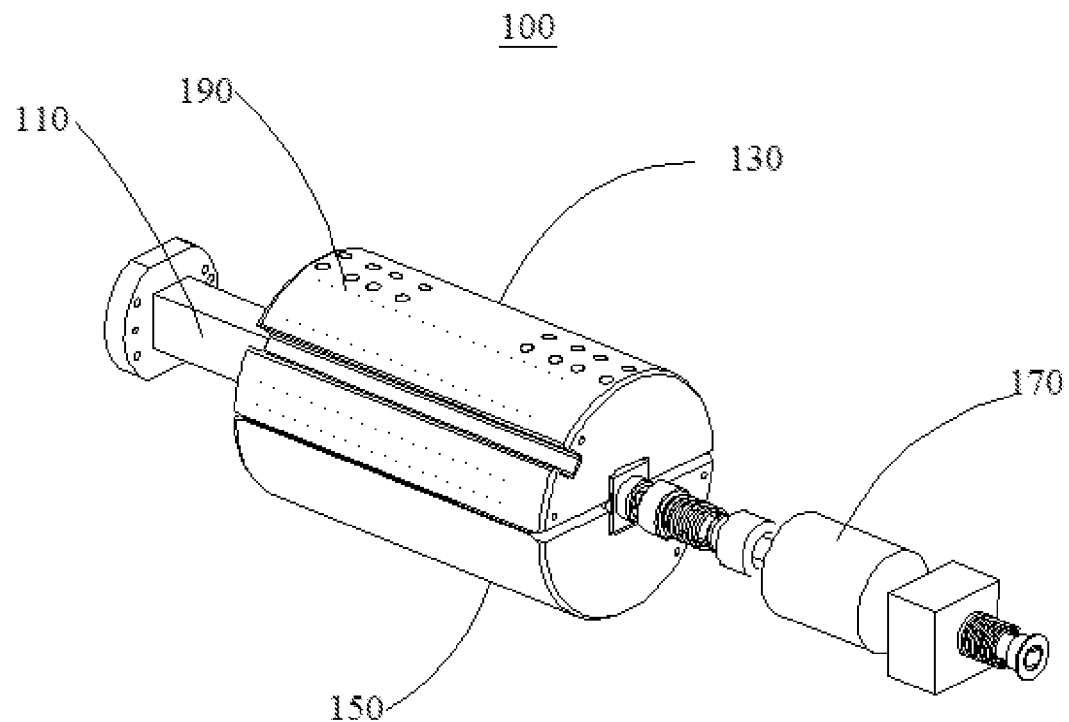
FIG. 1 is a schematic diagram of the overall structure of a variable-diameter adsorption winding needle mechanism provided in an embodiment of the present application from a first viewing angle.

Reference Number: 100—variable-diameter adsorption winding needle mechanism; 110—winding needle assembly; 1101—winding head; 1102—negative pressure pump; 111—fixing seat; 112—transmission shaft; 1121—movable through hole; 113—movable rod; 114—first movable block; 1141—first oblique hole; 115—second movable block; 1151—second oblique hole; 116—first elastic member; 117—first movable bearing; 118—second movable bearing; 130—first adsorption winding needle; 140—accommodating through hole; 150—second adsorption winding needle; 160—negative pressure pipeline; 170—pin assembly; 171—bearing seat; 172—connecting rod; 173—abutting rod; 174—brake caliper; 175—positioning sleeve; 176—adapter; 177—second elastic member; 178—third elastic member; 179—the connector; 190—the adsorption hole, and 1901—negative pressure cavity.

DETAILED DESCRIPTION OF EMBODIMENTS

In order to make the purposes, technical solutions and advantages of the embodiments of the present application clearer, the technical solutions in the embodiments of the present application will be clearly and completely described below with reference to the drawings in the embodiments of the present application. Obviously, the described embodiments are some of the embodiments of the present application, but not all embodiments. The components in the embodiments of the present application generally described and illustrated in the drawings herein may be arranged and designed in a variety of different configurations.

Thus, the following detailed description on the embodiments of the present application provided in the drawings is not intended to limit the protection scope of the present application, but is merely representative of selected embodiments of the present application. Based on the embodiments of the present application, all other embodiments obtained by those skilled in the art without creative efforts shall fall within the protection scope of the present application.

It should be noted that similar numerals and letters refer to similar items in the following figures, and thus once a certain item is defined in one figure, it is not required to further define and explain it in subsequent figures.

In the description of the present application, it should be noted that, if the terms, "upper", "lower", "inner", "outer", etc. are presented, the orientation or positional relationship indicated is based on the orientation or positional relationship shown in the drawings, or the orientation or positional relationship that the product of the present application is usually placed in use, and they are only for the convenience of describing the present application and simplifying the description, rather than indicating or implying that the device or element referred to must be in the specific orientation, or constructed and operated in a specific orientation, and thus it should not be construed as a limitation to the present application.

In addition, where the terms, "first", "second" and the like, are presented, they are only intended to describe the distinguishing, and should not be construed as indicating or implying the importance in the relativity.

It should be noted that the features in the embodiments of the present application may be combined with each other if no conflict.

First Embodiment

Figure 2:
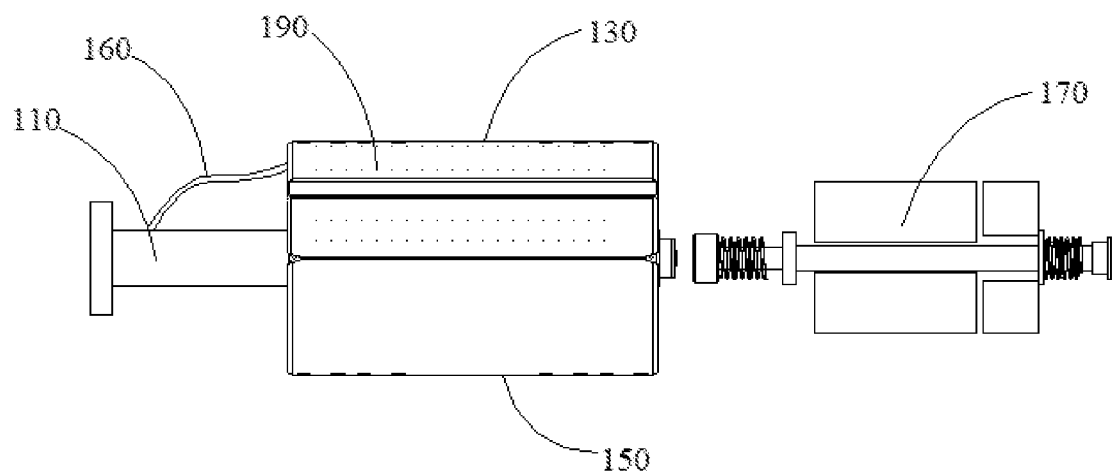
FIG. 2 is a schematic diagram of the overall structure of the variable-diameter adsorption winding needle mechanism provided in an embodiment of the present application from a second viewing angle.

Referring to FIG. 1 and FIG. 2, the present embodiment provides a variable-diameter adsorption winding needle mechanism 100, which can realize that the winding needle is replaced for performing the winding, without stopping the material tape (i.e., the winding needle can be replaced and start winding of a next jellyroll, without stopping winding of the material tap), further improving the production efficiency of the winding machine; and at the same time, it can also automatically adjust the winding diameter of the winding needle head, such that the winding head realizes the automatic changing of the diameter in the situation that the dislocation of the tabs is digitally automatically adjusted, wherein the dislocation of the tabs is adjusted in the unmanned operation, which improves the equipment efficiency and the utilization rate.

The variable-diameter adsorption winding needle mechanism 100 provided in this embodiment comprises a winding needle assembly 110, a first adsorption winding needle 130, a second adsorption winding needle 150 and a pin assembly 170, wherein the winding needle assembly 110 is used for connection with the winding head 1101, and is rotated under the driving of the winding head 1101. The first adsorption winding needle 130 and the second adsorption winding needle 150 are oppositely arranged and spliced to form a winding needle head for winding the material tape. An accommodating through hole 140, running through the winding needle head at the center thereof, is provided at the splicing position between the first adsorption winding needle 130 and the second adsorption winding needle 150. The winding needle assembly 110 partially penetrates through the accommodating through hole 140 and extends out from one end of the winding needle head. The pin assembly 170 is arranged on the other side of the winding needle head and is arranged as opposite to the accommodating through hole 140, so as to be used for being in detachable transmission connection with the winding needle assembly 110. The plurality of adsorption holes 190 for absorbing the head of the material tape are provided at the outer peripheral surfaces of the first adsorption winding needle 130 and the second adsorption winding needle 150.

The winding needle assembly 110 is also used to drive the first adsorption winding needle 130 and the second adsorption winding needle 150 to move away from or close to each other under the driving of the pin assembly 170, so as to increase or reduce the winding diameter of the winding needle head.

In this embodiment, the winding needle assembly 110 is configured to be arranged on the winding head 1101 of the winding machine, and is rotated under the driving of the winding head 1101, which further drives the winding needle head to rotate, so as to realize the winding of the material tape, wherein the material tape may be a separator, and in this embodiment, the separator which is used as an example is described.

In this embodiment, the first adsorption winding needle 130 and the second adsorption winding needle 150 are both of the semi-cylindrical structure. When the both move close to each other and are spliced together, an approximately cylindrical winding needle head can be formed, thereby completing the winding action. Herein, the winding function of the winding needle head is the same as that of a regular winding needle. In addition, since the surfaces of the first adsorption winding needle 130 and the second adsorption winding needle 150 are provided with the adsorption holes 190, it can be realized that the head of the separator is adsorbed, so that the separator does not need to be sandwiched between the first adsorption winding needle 130 and the second adsorption winding needle 150. When switching the material roll, it is only necessary to control the air pressure of the adsorption holes 190 to make the separator separated from the first adsorption winding needle 130 and the second adsorption winding needle 150, and it is also not necessary to remove the separator from the location between the first adsorption winding needle 130 and the second adsorption winding needle 150 after stopping the machine, so as to realize the action of replacing the roll without stopping the separator, which further improves the production efficiency of the winding machine.

In this embodiment, the negative pressure cavity 1901 is provided on each of the first adsorption winding needle 130 and the second adsorption winding needle 150, each adsorption hole 190 is communicated with the corresponding negative pressure cavity 1901, and the negative pressure cavity 1901 is externally connected with the negative pressure pipeline 160, wherein the negative pressure pipeline 160 is used to be connected with the negative pressure pump 1102. Specifically, the number of negative pressure pipelines 160 may be one or two, and at the same time, the negative pressure pumps 1102 can be together arranged on the winding head 1101, so as to ensure it is relatively fixed and in synchronous rotation with the negative pressure pumps 1102, avoiding the negative pressure pipeline 160 from being entangled. Here, the negative pressure pumps can generate the negative pressures in the negative pressure cavities through the negative pressure pipelines 160, and utilize a plurality of adsorption holes 190 to realize the adsorption effect on the separator. The existing vacuum adsorption device can be referred to for the adsorption principle.

Figure 3:
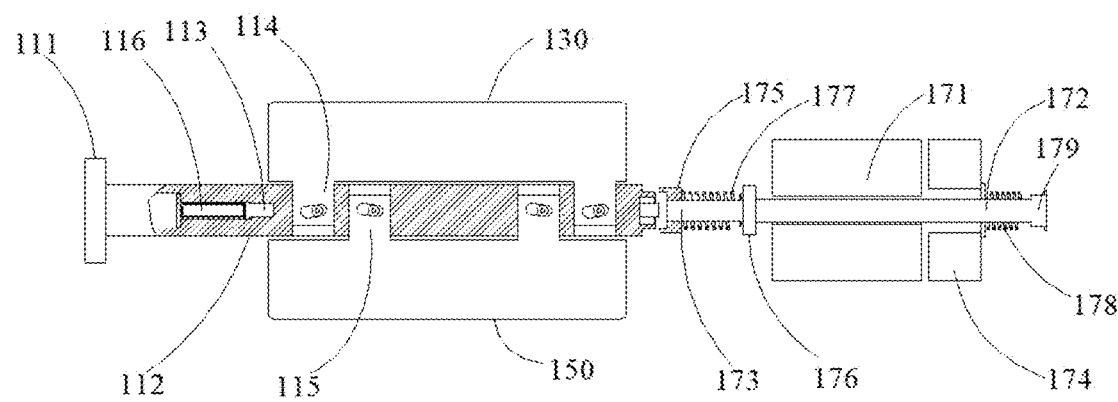
FIG. 3 is an internal cross-sectional structural schematic diagram of a variable-diameter adsorption winding needle mechanism provided by an embodiment of the present application.
Figure 4:
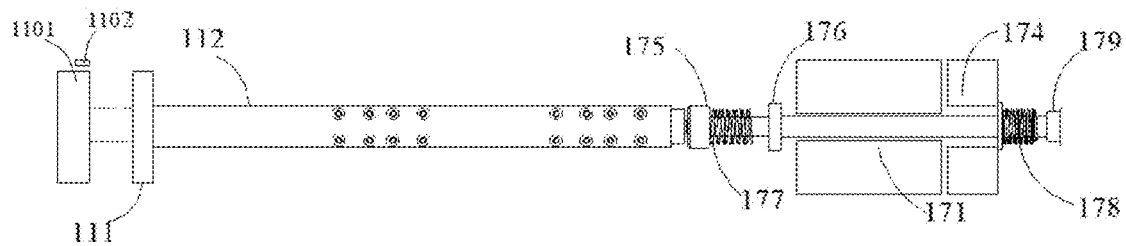
FIG. 4 is a schematic diagram of the assembly structure of the winding needle assembly and the pin assembly in FIG. 1.
Figure 5:
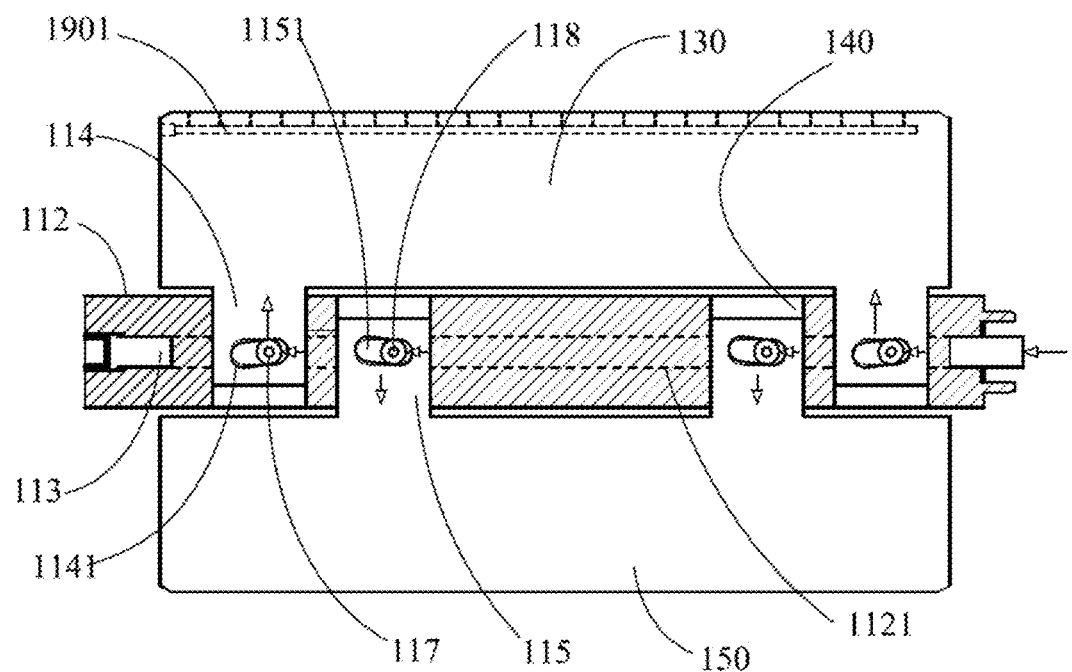
FIG. 5 is a schematic diagram of the connection structure of the first adsorption winding needle, the second adsorption winding needle and the winding needle assembly in FIG. 1.

Referring to FIGS. 3 to 5, the winding needle assembly 110 comprises a fixing seat 111, a transmission shaft 112, a movable rod 113, a first movable block 114 and a second movable block 115. The fixing seat 111 is used to be connected with the winding head 1101, and the transmission shaft 112 has one end connected to the fixing seat 111 and the other end which penetrates through the accommodating through hole 140. And, a movable through hole 1121 is formed at the axis of the transmission shaft 112, and the movable rod 113 is movably arranged in the movable through hole 1121. The pin assembly 170 is used for engaging with the transmission shaft 112 and abuts on the movable rod 113. The first movable block 114 and the second movable block 115 are both arranged in the accommodating through hole 140, and the first movable block 114 is connected with the first adsorption winding needle 130, and the second movable block 115 is connected with the second adsorption winding needle 150. The movable rod 113 is in transmission connection with both the first movable block 114 and the second movable block 115, and is configured to move along the movable through hole 1121 under the abutment of the pin assembly 170 and drive the first movable block 114 and the second movable block 115 to move in opposite directions, so that the first adsorption winding needle 130 and the second adsorption winding needle 150 move close to or away from each other.

In this embodiment, the movable rod 113 is provided thereon with a first movable bearing 117 and a second movable bearing 118 at interval. The first movable block 114 is provided with a first oblique hole 1141 inclined upwardly, and the first movable bearing 117 is movably accommodated in the first oblique hole 1141, so as to move in the first oblique hole 1141 under the driving of the movable rod 113 to drive the first movable block 114 to move in the direction perpendicular to the movable rod 113. The second movable block 115 is arranged to be spaced from the first movable block 114, and is provided with the second oblique hole 1151 which is downwardly inclined, and the second movable bearing 118 is movably accommodated in the second oblique hole 1151 so as to move in the second oblique hole 1151 under the driving of the movable rod 113, to drive the second movable block 115 to move in a direction perpendicular to the movable rod 113. Specifically, the first oblique hole 1141 and the second oblique hole 1151 are both waist round holes, and the angle value between the long axis of the first oblique hole 1141 and the horizontal direction and the angle value between the long axis of the second oblique hole 1151 and the horizontal direction are the same, so that the first movable block 114 and the second movable block 115 can oppositely move, synchronously and identically.

It is worth noting that the movable rod 113 is arranged in the horizontal direction and can move along the movable through hole 1121. When the movable rod 113 is moving along the horizontal direction, the first movable bearing 117 and the second movable bearing 118 are at the height, which remains unchanged. During the movement, due to the limiting effect of the first oblique hole 1141 and the second oblique hole 1151, the first movable block 114 and the second movable block 115 can be made to move relative to each other. For example, during the movable rod 113 moving to the left, the first movable block 114 moves upwardly, so that the first adsorption winding needle 130 moves upwardly, and the second movable block 115 moves downwardly, thereby further causing the second adsorption winding needle 150 to move downwardly, and the first adsorption winding needle 130 and the second adsorption winding needles 150 move away from each other, while when the movable rod 113 moves to the right, the situation is just contrary.

Both the first movable block 114 and the second movable block 115 are provided as plural, and the first movable bearing 117 and the second movable bearing 118 are both provided as plural. The plural first movable blocks 114 are connected with two sides of the bottom of the first adsorption winding needle 130, and the plurality of second movable blocks 115 are connected with two sides of the top of the second adsorption winding needle 150. Each first movable block 114 is provided with the first oblique hole 1141, and the plurality of first movable bearings 117 are assembled in the plurality of first oblique holes 1141 correspondingly one to one, and the plurality of second movable bearings 118 are assembled in the plurality of second oblique holes 1151 correspondingly one to one.

In this embodiment, the fixing seat 111 can be fixed on the winding head by bolts and other connecting members, and kept as relatively fixed with the winding head 1101. One end of the transmission shaft 112 is fixedly connected to the fixing seat 111, and the other end thereof is provided penetratingly in the accommodating through hole 140. Specifically, in this embodiment, the first adsorption winding needle 130 and the second adsorption winding needle 150 are arranged in an up-down direction. Two first movable block 114 and two second movable block 115 are provided. The two first movable blocks 114 are connected with two sides of the bottom of the first adsorption winding needle 130, and the two second movable blocks 115 are both disposed between the two first movable blocks 114 and connected to two sides of the top of the second adsorption winding needle 150.

It should be noted that in this embodiment, the pin assembly 170 is connected to an external power source, and can act on the movable rod 113 under the driving of the external power source, and drive, through the movable rod 113, the first movable block 114 and the second movable block 115 to move in the opposite directions, so that the first adsorption winding needle 130 and the second adsorption winding needle 150 move close to or away from each other.

In this embodiment, a first elastic member 116 is also provided at one end of the movable through hole 1121 close to the fixing seat 111, and the first elastic member 116 abuts against the end of the movable rod 113 for providing to the movable rod 113 the elastic force towards a pin assembly 170. Specifically, the first elastic member 116 is a compression spring, which can provide to the movable rod 113 the elastic force to the right, so that the movable rod 113 can return to the original position.

It should be noted that in this embodiment, the pin assembly 170 can abut on the movable rod 113, and exert a leftward pressure on the movable rod 113, so that the movable rod 113 can move to the left. The first movable bearing 117 and the second movable bearing 118 follow the movable rod 113 to move to the left, and cause, through the limiting effect of the first oblique hole 1141 and the second oblique hole 1151, the first movable block 114 to move upwardly and the second movable block 115 to move downwardly, so that the first adsorption winding needle 130 and the second adsorption winding needle 150 move away from each other, thereby increasing the winding diameter. When the winding needle needs to be disengaged after the winding is completed, the pin assembly 170, at this time, moves away from the movable rod 113 to release the abutment to the movable rod 113. At this time, the movable rod 113 moves to the right under the effect of the elastic force of the compression spring, and causes, through the limiting effect of the first oblique hole 1141 and the second oblique hole 1151, the first movable block 114 to move downwardly and the second movable block 115 to move upwardly, so that the first adsorption winding needle 130 and the second adsorption winding needle 150 move close to each other, thereby reducing the winding diameter, which is convenient for the winding needle being taken out from the material roll.

The pin assembly 170 comprises a bearing seat 171, a connecting rod 172, an abutting rod 173 and a brake caliper 174. The connecting rod 172 is provided as movably penetrating through the bearing seat 171. One end of the abutting rod 173 is connected with one end of the connecting rod 172, and the other end thereof is configured to abut against the movable rod 113 and drive the movable rod 113 to move. The end of the connecting rod 172 away from the abutting rod 173 is configured to move under the driving of the linear driving member, and is used to drive the abutting rod 173 to move close to or away from the movable rod 113. The brake caliper 174 is arranged on the bearing seat 171 for selectively fixing the connecting rod 172. Specifically, the bearing seat 171 is used to be fixedly installed on the external frame, and plays a role of supporting.

One end of the abutting rod 173 is connected to one end of the connecting rod 172, and the other end thereof can abut on the movable rod 113, thereby driving the movable rod 113 to move to the left to realize the expansion of the winding diameter of the winding needle head.

Further, the pin assembly 170 further comprises a positioning sleeve 175, the positioning sleeve 175 is disposed at one end of the abutting rod 173 away from the bearing seat 171, and is used for being insertedly connected with the end of the transmission shaft 112, so that the movable rod 113 and the abutting rod 173 are placed as aligned. Specifically, the end of the transmission shaft 112 is provided with an insertion ring, and the end face of the positioning sleeve 175 is provided with an insertion slot. When the positioning sleeve 175 is connected in an insertion way with the transmission shaft 112, the insertion ring is inserted into the insertion slot, so that positioning can be achieved, which is convenient for the abutting rod 173 accurately abutting on the end of the movable rod 113 and pushing the movable rod 113 to move.

In this embodiment, an end of the abutting rod 173 close to the bearing seat 171 is provided with an adaptor 176, the abutting rod 173 is connected with the connecting rod 172 through the adaptor 176, and a second elastic member 177 is provided between the adaptor 176 and the positioning sleeve 175. The second elastic member 177 is used to provide to the positioning sleeve 175 the elastic force away from the bearing seat 171. Specifically, the positioning sleeve 175 can be movably sleeved on the abutting rod 173, and the second elastic member 177 is a compression spring. When the positioning sleeve 175 is connected in an insertion way with the transmission shaft 112, the positioning sleeve 175 can move relative to the abutting rod 173, in order to facilitate the abutting rod 173 to move to the left continuously. After the abutting rod 173 is disengaged from the movable rod 113, the second elastic member 177 can provide a rightward elastic force to help the positioning sleeve 175 return to the original position to facilitate the next abutting action.

In this embodiment, one end of the connecting rod 172 away from the abutting rod 173 extends out from the bearing seat 171, and is provided with a connecting head 179. The connecting head 179 is used for abutting against the linear driving member, and the brake caliper 174 is arranged on one side of the bearing seat 171 close to the connecting head 179. The third elastic member 178 is disposed between the connecting head 179 and the brake caliper 174, and the third elastic member 178 is used to provide to the connecting head 179 the elastic force away from the bearing seat 171. Specifically, the linear driving member may be an air cylinder, and the third elastic member 178 may also be a compression spring. By providing the third elastic member 178, the abutting rod 173 can be made to automatically move to the right after the clamping of the brake caliper 174 is released, thereby realizing the returning to the original position.

It should be noted that in this embodiment, the connecting head 179 on the connecting rod 172 is used to move to the left under the abutment of a linear driving member, such as a cylinder, and drives the abutting rod 173 to move to the left. The abutting rod 173 is positioned through the positioning sleeve 175, and can abut on the movable rod 113, thereby driving the movable rod 113 to move. At this time, the first elastic member 116, the second elastic member 177 and the third elastic member 178 are all in a compressed state. After the abutting rod 173 abutting in place, the connecting rod 172 can be fixed by the brake caliper 174, so that it can remain fixed with respect to the bearing seat 171, and the abutting rod 173 maintains the abutting action. The first adsorption winding needle 130 and the second adsorption winding needle 150 are kept away from each other, and at the same time, the winding action can be completed. Since the adapter 176 is provided between the abutting rod 173 and the connecting rod 172, the abutting rod 173 and the positioning sleeve 175 can rotate along with the transmission shaft 112 and the movable rod 113, while the connecting rod 172 remains fixed under the action of the brake caliper 174.

When the needle needs to be withdrawn after completing the winding, the limiting of the brake caliper 174, on the connecting rod 172, is released. Under the action of the third elastic member 178, the connecting rod 172 moves to the right and returns to the original position, to drive the abutting rod 173 to move to the right and release the abutment on the movable rod 113. The positioning sleeve 175 returns to the original position under the effect of the elastic force of the second elastic member 177, and the movable rod 113 is returns toward the right to the original position under the effect of the elastic force of the first elastic member 116. At this time, the first movable block 114 and the second movable block 115 drive the first adsorption winding needle 130 and the second adsorption winding needle 150 to move close to each other, and realize the needle withdrawal through the winding head 1101.

The working principle of the variable-diameter adsorption winding needle mechanism 100 provided in this embodiment is as follows. The external linear driving member is used to abut against the connecting head 179 to drive the connecting rod 172 to move toward the left, and the connecting rod 172 drives the abutting rod 173 to move to the left, and the inserted connection between the positioning sleeve 175 and the transmission shaft 112 is used to achieve the positioning, the abutting rod 173 abuts on the movable rod 113, and the movable rod 113 is made to move to the left. The first movable bearing 117 fixed on the movable rod 113 pushes the at least one first movable block 114 to move upwardly. The second movable bearing 118 pushes the at least one second movable block 115 to move downwardly, and the at least one first movable block 114 and the at least one second movable block move synchronously, realizes that the first adsorption winding needle 130 connected with the at least one first movable block 114 and the second adsorption winding needle 150 connected with the at least one second movable block 115 move away from each other so as to increase the winding diameter of the winding needle head. After abutting in place, the brake caliper 174 locks the connecting rod 172, and at this time, the linear driving member is retracted, while the winding needle assembly 110 and the pin assembly 170 are still in the clamping state, and can rotating the station following the winding head 1101, to complete the winding action. During the winding, both ends of the winding needle head are supported by the fixing seat 111 and the positioning sleeve 175 respectively, so as to ensure the stability of the winding. When it is time to unlock and unload the jellyroll, the brake caliper 174 releases the connecting rod 172. Under the effect of the elastic force of the third elastic member 178, the connecting rod 172 moves to the right, which drives the abutting rod 173 to disengage from the movable rod 113, and the positioning sleeve 175 disengages from the transmission rod, and returns to the original position under effect of the elastic force of the second elastic member 177. The movable rod 113 moves to the right under effect of the elastic force of the first elastic member 116, and the first movable bearing 117 and the second movable bearing 118 on the movable rod 113 respectively push the first movable block 114 and the second movable block 115 to move, so that the first adsorption winding needle 130 and the second adsorption winding needle 150 move close to each other, thereby reducing the winding diameter. At this time, the winding needle assembly 110 and the pin assembly 170 are in a separated state, which is convenient for unloading the jellyroll.

To sum up, in the variable-diameter adsorption winding needle mechanism 100 provided in this embodiment, the winding needle assembly 110 is connected with the winding head 1101, the first adsorption winding needle 130 and the second adsorption winding needle 150 are oppositely arranged and spliced to form a winding needle head, the winding needle head is used for winding the material tape, an accommodating through hole 140, which runs through the winding needle head at the center thereof, is provided at the splicing position between the first adsorption winding needle 130 and the second adsorption winding needle 150, and the winding needle assembly 110 partially penetrates through the accommodating through hole 140 and extends out from one end of the winding needle head. The pin assembly 170, which is arranged at the other end of the winding needle head, is provided as opposite to the accommodating through hole 140, and is configured to be in detachable transmission connection with the winding needle assembly 110. A plurality of adsorption holes 190 are provided on the outer peripheral surfaces of the first adsorption winding needle 130 and the second adsorption winding needle 150 for absorbing the head of the material tape, and at the same time, the winding needle assembly 110 is also used to drive, under the driving of the pin assembly, the first adsorption winding needle 130 and the second adsorption winding needle 150 to move close to or away from each other, so as to reduce or increase the winding diameter of the winding needle head. In the variable-diameter adsorption winding needle mechanism 100 provided in this embodiment, the head of the material tape is absorbed through the plurality of adsorption holes 190, thereby avoiding that the material tape passes through the winding needle to achieve the clamping, enabling that the winding needle is replaced to perform the winding without stopping the material tape, which further improves the production efficiency of the winding machine; and at the same time, the winding diameter of the needle head can be automatically adjusted, and the winding head achieves the automatic changing of the diameter in the situation that the dislocation of the tabs is digitally automatically adjusted, wherein the dislocation of the tabs is adjusted in the unmanned operation, improving the equipment efficiency and the utilization rate.

Second Embodiment

This embodiment provides a winding machine, including a variable-diameter adsorption winding needle mechanism 100, wherein the basic structure, principle and produced technical effects of the variable-diameter adsorption winding needle mechanism 100 are the same as those in the first embodiment.

For the purpose of simplifying the description, the corresponding content in the first embodiment may be referred to for the parts not mentioned in this embodiment.

In this embodiment, the winding machine comprises a winding head 1101, a frame, a negative pressure pump 1102, a linear driving member, and a variable-diameter adsorption winding needle. The variable-diameter adsorption winding needle mechanism 100 comprises a winding needle assembly 110, a first adsorption winding needle 130, the second adsorption winding needle 150 and a pin assembly 170. The winding needle assembly 110 is connected with the winding head 1101 and is rotated under the driving of the winding head 1101.

The first adsorption winding needle 130 and the second adsorption winding needle 150 are arranged opposite to each other and spliced to form a winding needle head for winding the material tape. The accommodation through hole, that runs through the winding needle head at the center thereof, is provided at the splicing position between the first adsorption winding needle 130 and the second adsorption winding needle 150. The winding needle assembly 110 is arranged as partially penetrating through the accommodation through hole and extends out from one end of the winding needle head. The pin assembly 170, which is arranged at the other end of the winding needle head, is provided as opposite to the accommodating through hole 140, and is configured to be in detachable transmission connection with the winding needle assembly 110.

The plurality of adsorption holes 190 for adsorbing the head of the material tape are provided on the outer peripheral surfaces of the first adsorption winding needle 130 and the second adsorption winding needle 150. The winding needle assembly 110 is also configured to drive, under the driving of the pin assembly 170, the first adsorption winding needle 130 and the second adsorption winding needle 150 to move away from or close to each other, so as to increase or decrease the winding diameter of the winding needle. Specifically, the winding head 1101 and the pin assembly 170 are both connected to the frame, the negative pressure pump 1102 is arranged on the winding head 1101 and is connected to the first adsorption winding needle 130 and the second adsorption winding needle 150 through the negative pressure pipeline 160. The linear driving member is also arranged on the frame and connected with the pin assembly 170 for driving the winding needle assembly 110 through the pin assembly 170.

Of course, the basic structure, the principle, the produced technical effects of the winding machine mentioned in this embodiment are the same as those of the conventional winding machine, and the existing winding machine may be referred to for details.

The above are only the embodiments of the present application, but the protection scope of the present application is not limited thereto. The modifications or substitutions in the technical scope disclosed by the present application, which are conceived of by any person skilled in the art who is familiar with the technical field, should be included within the protection scope of the present application. Therefore, the protection scope of the present application should be based on the protection scope of the claims.

What is claimed is:

1. A variable-diameter adsorption winding needle mechanism, comprising a winding needle assembly, a first adsorption winding needle, a second adsorption winding needle and a pin assembly, wherein the winding needle assembly is configured to be connected with a winding head and rotated under driving of the winding head, the first adsorption winding needle and the second adsorption winding needle are arranged oppositely and configured to be spliced to form a winding needle head for winding a material tape, an accommodating through hole running through the winding needle head at center thereof is provided at a splicing position between the first adsorption winding needle and the second adsorption winding needle, the winding needle assembly is arranged as partially penetrating through the accommodating through hole and extends out from one end of the winding needle head, the pin assembly is arranged at the other end of the winding needle head, is arranged opposite to the accommodating through hole, and is configured to be in detachable transmission connection with the winding needle assembly, a plurality of adsorption holes configured for adsorbing a head of the material tape are provided on outer peripheral surfaces of the first adsorption winding needle and the second adsorption winding needle, the winding needle assembly is further configured to drive the first adsorption winding needle and the second adsorption winding needle to move away or close to each other under driving of the pin assembly, so as to increase or decrease a winding diameter of the winding needle head.

2. The variable-diameter adsorption winding needle mechanism according to claim 1, wherein a negative pressure cavity is provided on each of the first adsorption winding needle and the second adsorption winding needle, and each of the adsorption holes is communicated with a corresponding negative pressure cavity, and the negative pressure cavity is externally connected with a negative pressure pipeline which is configured to be connected with a negative pressure pump.

3. The variable-diameter adsorption winding needle mechanism according to claim 1, wherein the winding needle assembly comprises a fixing seat, a transmission shaft, a movable rod, at least one first movable block and at least one second movable block, the fixing seat is configured to be connected with the winding head, the transmission shaft has one end connected with the fixing seat and the other end arranged penetratingly in the accommodating through hole, and a movable through hole is formed at an axis of the transmission shaft and the movable rod is movably arranged in the movable through hole, the pin assembly is configured for engaging with the transmission shaft and abutting on the movable rod, the at least one first movable block and the at least one second movable block are each arranged in the accommodating through hole, the at least one first movable block is connected with the first adsorption winding needle, the at least one second movable block is connected with the second adsorption winding needle, and the movable rod is in transmission connection with both the at least one first movable block and the at least one second movable block and is configured to move along the movable through hole under abutment of the pin assembly and drive the at least one first movable block and the at least one second movable block to move in opposite directions to make the first adsorption winding needle and the second adsorption winding needle move close to or away from each other.

4. The variable-diameter adsorption winding needle mechanism according to claim 3, wherein the movable rod is provided thereon with at least one first movable bearing and at least one second movable bearing at interval, and the at least one first movable block is each provided with a first oblique hole which is inclined upwardly, the at least one first movable bearing is movably accommodated in the first oblique hole and is configured to move in the first oblique hole under driving of the movable rod to drive the at least one first movable block to move in a direction perpendicular to the movable rod, the at least one second movable block is arranged as spaced apart from the at least one first movable block and is each provided with a second oblique hole inclined downwardly, and the at least one second movable bearing is movably accommodated in the second oblique hole and is configured to move in the second oblique hole under driving of the movable rod, so as to drive the at least one second movable block to move in the direction perpendicular to the movable rod.

5. The variable-diameter adsorption winding needle mechanism according to claim 4, wherein the at least one first movable block and the at least one second movable block are provided as plural, and the at least one first movable bearing and the at least one second movable bearing are provided as plural, the plural first movable blocks are connected to two sides of a bottom of the first adsorption winding needle, and the plural second movable blocks are connected to two sides of a top of the second adsorption winding needle, each of the first movable blocks is provided with the first oblique hole, a plurality of the first movable bearings are assembled in the plurality of the first oblique holes correspondingly one-to-one, and the plural second movable bearings are assembled in the plurality of second oblique holes correspondingly one-to-one.

6. The variable-diameter adsorption winding needle mechanism according to claim 3, wherein a first elastic member is further provided at one end of the movable through hole close to the fixing seat, and the first elastic member abuts against an end of the movable rod and is configured to provide, to the movable rod, an elastic force towards the pin assembly.

7. The variable-diameter adsorption winding needle mechanism according to claim 3, wherein the pin assembly comprises a bearing seat, a connecting rod, an abutting rod and a brake caliper, wherein the connecting rod is provided as movably penetrating through the bearing seat, the abutting rod has one end connected with one end of the connecting rod and the other end configured to abut on the movable rod and drive the movable rod to move, and one end of the connecting rod away from the abutting rod is configured to move under driving of a linear driving member and is configured to drive the abutting rod to move close to or away from the movable rod, and the brake caliper is arranged on the bearing seat so as to selectively fix the connection rod.

8. The variable-diameter adsorption winding needle mechanism according to claim 7, wherein the pin assembly further comprises a positioning sleeve, and the positioning sleeve is disposed at an end of the abutting rod away from the bearing seat and is configured for being connected, in an insertion way, with an end of the transmission shaft, so that the movable rod and the abutting rod are placed as aligned.

9. The variable-diameter adsorption winding needle mechanism according to claim 8, wherein an end of the abutting rod close to the bearing seat is provided with an adapter, and the abutting rod is connected with the connecting rod through the adapter, a second elastic member is arranged between the adapter and the positioning sleeve, and the second elastic member is configured to provide to the positioning sleeve an elastic force away from the bearing seat.

10. The variable-diameter adsorption winding needle mechanism according to claim 9, wherein an end of the connecting rod away from the abutting rod extends out of the bearing seat and is provided with a connecting head, the connecting head is configured in such a way that the connecting head and the linear driving member abut against each other, the brake caliper is arranged on a side of the bearing seat close to the connecting head, a third elastic member is arranged between the connecting head and the brake caliper, and the third elastic member is configured for providing to the connecting head an elastic force away from the bearing seat.

11. A winding machine, comprising a winding head and the variable-diameter adsorption winding needle mechanism according to claim 1, wherein the winding needle assembly is connected to the winding head.

12. The winding machine according to claim 11, wherein a negative pressure cavity is provided on each of the first adsorption winding needle and the second adsorption winding needle, and each of the adsorption holes is communicated with a corresponding negative pressure cavity, and the negative pressure cavity is externally connected with a negative pressure pipeline which is configured to be connected with a negative pressure pump.

13. The winding machine according to claim 11, wherein the winding needle assembly comprises a fixing seat, a transmission shaft, a movable rod, at least one first movable block and at least one second movable block, the fixing seat is configured to be connected with the winding head, the transmission shaft has one end connected with the fixing seat and the other end arranged penetratingly in the accommodating through hole, and a movable through hole is formed at an axis of the transmission shaft and the movable rod is movably arranged in the movable through hole, the pin assembly is configured for engaging with the transmission shaft and abutting on the movable rod, the at least one first movable block and the at least one second movable block are each arranged in the accommodating through hole, the at least one first movable block is connected with the first adsorption winding needle, the at least one second movable block is connected with the second adsorption winding needle, and the movable rod is in transmission connection with both the at least one first movable block and the at least one second movable block and is configured to move along the movable through hole under abutment of the pin assembly and drive the at least one first movable block and the at least one second movable block to move in opposite directions to make the first adsorption winding needle and the second adsorption winding needle move close to or away from each other.

14. The winding machine according to claim 13, wherein the movable rod is provided thereon with at least one first movable bearing and at least one second movable bearing at interval, and the at least one first movable block is each provided with a first oblique hole which is inclined upwardly, the at least one first movable bearing is movably accommodated in the first oblique hole and is configured to move in the first oblique hole under driving of the movable rod to drive the at least one first movable block to move in a direction perpendicular to the movable rod, the at least one second movable block is arranged as spaced apart from the at least one first movable block and is each provided with a second oblique hole inclined downwardly, and the at least one second movable bearing is movably accommodated in the second oblique hole and is configured to move in the second oblique hole under driving of the movable rod, so as to drive the at least one second movable block to move in the direction perpendicular to the movable rod.

15. The winding machine according to claim 14, wherein the at least one first movable block and the at least one second movable block are provided as plural, and the at least one first movable bearing and the at least one second movable bearing are provided as plural, the plural first movable blocks are connected to two sides of a bottom of the first adsorption winding needle, and the plural second movable blocks are connected to two sides of a top of the second adsorption winding needle, each of the first movable blocks is provided with the first oblique hole, a plurality of the first movable bearings are assembled in the plurality of the first oblique holes correspondingly one-to-one, and the plural second movable bearings are assembled in the plurality of second oblique holes correspondingly one-to-one.

16. The winding machine according to claim 13, wherein a first elastic member is further provided at one end of the movable through hole close to the fixing seat, and the first elastic member abuts against an end of the movable rod and is configured to provide, to the movable rod, an elastic force towards the pin assembly.

17. The winding machine according to claim 13, wherein the pin assembly comprises a bearing seat, a connecting rod, an abutting rod and a brake caliper, wherein the connecting rod is provided as movably penetrating through the bearing seat, the abutting rod has one end connected with one end of the connecting rod and the other end configured to abut on the movable rod and drive the movable rod to move, and one end of the connecting rod away from the abutting rod is configured to move under driving of a linear driving member and is configured to drive the abutting rod to move close to or away from the movable rod, and the brake caliper is arranged on the bearing seat so as to selectively fix the connection rod.

18. The winding machine according to claim 17, wherein the pin assembly further comprises a positioning sleeve, and the positioning sleeve is disposed at an end of the abutting rod away from the bearing seat and is configured for being connected, in an insertion way, with an end of the transmission shaft, so that the movable rod and the abutting rod are placed as aligned.

19. The winding machine according to claim 18, wherein an end of the abutting rod close to the bearing seat is provided with an adapter, and the abutting rod is connected with the connecting rod through the adapter, a second elastic member is arranged between the adapter and the positioning sleeve, and the second elastic member is configured to provide to the positioning sleeve an elastic force away from the bearing seat.

20. The winding machine according to claim 19, wherein an end of the connecting rod away from the abutting rod extends out of the bearing seat and is provided with a connecting head, the connecting head is configured in such a way that the connecting head and the linear driving member abut against each other, the brake caliper is arranged on a side of the bearing seat close to the connecting head, a third elastic member is arranged between the connecting head and the brake caliper, and the third elastic member is configured for providing to the connecting head an elastic force away from the bearing seat.

* * * * *